United States Patent [19]

Munter et al.

[11] 4,265,919
[45] May 5, 1981

[54] PROCESS FOR PRODUCING A FOOD PRODUCT

[75] Inventors: Arnold M. Munter; David W. Ahlgren, both of Duluth, Minn.

[73] Assignee: Jeno's, Inc., Duluth, Minn.

[21] Appl. No.: 155,567

[22] Filed: Jun. 2, 1980

[51] Int. Cl.³ .............................................. A21D 8/02
[52] U.S. Cl. ..................................... 426/283; 99/353;
99/432; 99/DIG. 15; 426/94; 426/132;
426/138; 426/302; 426/391; 426/393; 426/420;
426/502
[58] Field of Search ..................... 426/138, 95, 92, 94,
426/90, 390, 391, 502, 496, 275, 283, 128, 113,
139, 505, 514, 393, 512, 132, 124, 523, 420, 302;
99/DIG. 15, 381, 432, 433, 428, 353, 426

[56] References Cited

U.S. PATENT DOCUMENTS

| | | | |
|---|---|---|---|
| 1,097,367 | 5/1914 | Sabin | 99/433 |
| 1,612,551 | 12/1926 | Twoney | 99/DIG. 15 |
| 1,815,527 | 7/1931 | Scruggs | 426/139 |
| 2,111,021 | 3/1938 | Bemis | 426/391 |
| 2,363,395 | 11/1944 | Calia | 426/283 |
| 2,768,086 | 10/1956 | Bliley | 426/128 |
| 3,031,309 | 4/1962 | Bogner et al. | 426/94 |
| 4,065,581 | 12/1977 | Heiderpriem | 426/138 |
| 4,137,333 | 1/1979 | Daswick | 426/113 |

*Primary Examiner*—Steven L. Weinstein
*Attorney, Agent, or Firm*—Hume, Clement, Brinks, Willian & Olds, Ltd.

[57] ABSTRACT

A process for producing a frozen, pre-prepared food product is disclosed. In order to practice the process, a container is provided which has a centrally-depressed receptacle with an outwardly and downwardly extending rim. A food filling is first deposited in the container receptacle. The container receptacle and rim are then covered with a sheet of unbaked dough so that the dough conforms to the container rim. The now-filled and covered container which comprises the food product is then frozen so that when a sufficient amount of heat is applied to the product, the filling heats to a fluid state. Thus, when the food product is inverted and the container is removed, the filling flows outwardly to fill the upstanding crust formed by the baked dough.

6 Claims, 5 Drawing Figures

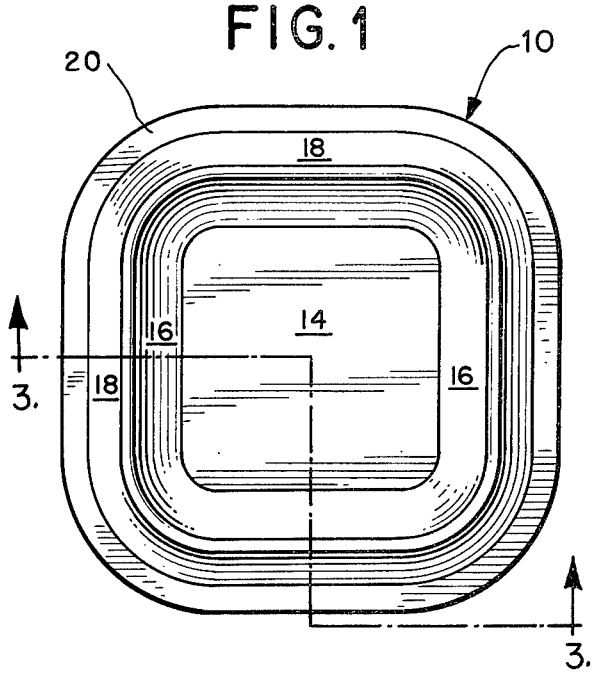
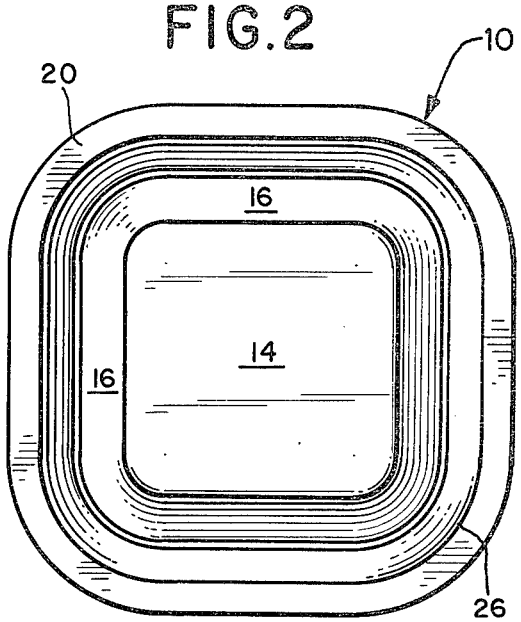
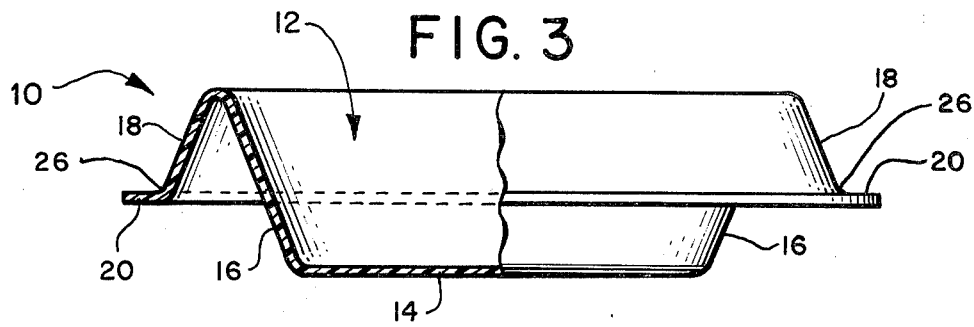
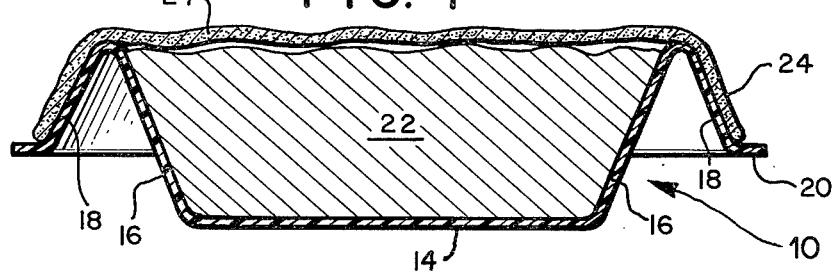
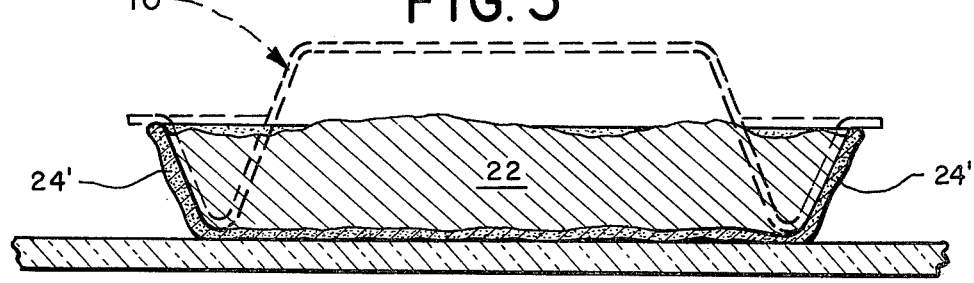

PROCESS FOR PRODUCING A FOOD PRODUCT

BACKGROUND AND SUMMARY OF THE INVENTION

This invention relates to frozen pre-prepared food products. More particularly, the invention relates to a process for producing a frozen pre-prepared food product which can be stored for extended periods of time with minimal degradation.

Frozen pre-prepared food products have been produced and marketed for many years. For example, one of the most common examples of such products is a pot pie, consisting of top and bottom sheets of dough with a filling therebetween. These pies are conventionally marketed in a disposable foil container. In order to prepare the pie, it is cooked until the crusts are baked and the filling is hot. The pie is then typically dumped upside down on a serving plate for consumption.

While such pies are often of acceptable quality, extended storage times can result in a drop in quality, particularly with respect to the bottom crust. This is true even if the pie remains frozen during the entire storage period. One reason for this deterioration is that, even in a frozen condition, the raw dough at the bottom of the pie tends to absorb moisture from the filling. This results in sogginess of the bottom crust after heating.

One possible way to minimize the absorption problem is to pre-bake the pastry prior to refrigeration and sale, but such a product may be less palatable than one which has been baked immediately prior to consumption. Moreover, even the pre-baked pastry will absorb moisture from the filling as long as the filling is in direct contact and resting upon the crust.

Pizza is another good example of a common pre-prepared frozen food. A conventional frozen pizza typically has a pre-baked crust. Pizza toppings such as tomato sauce, cheese, meat and seasonings are deposited on the crust. A raised edge is often provided on the outer periphery of the crust to minimize the spilling of toppings over the edge of the pizza. The pizza is then frozen and wrapped for sale.

The problem of crust absorption discussed above with respect to pot pies is also true with pizzas. In fact, this problem will always exist whenever moisture-laden food is positioned directly above and in contact with dough, whether the dough is raw or pre-baked.

Additional problems exist with respect to pizza due to the fact that the toppings are exposed and not contained within the food product. Even with a protective covering such as plastic or cellophane, toppings become dehydrated, resulting in possible deterioration of the quality of the meat and poor cheese melt once the pizza is baked. Pizza toppings also can become dislodged and lost from the pizza. Attempts to solve these problems have centered around a search for a superior wrapping which will still permit the pizza toppings to be visible to the customer. Thermoplastic shrink-wrap has been used to some extent but it has not been altogether satisfactory. Shrinkwrap, of course, has no effect on the problem of moisture absorption from the toppings.

Hence, an object of the present invention is to provide a method of production which effectively and reliably overcomes the aforementioned drawbacks and limitations of the proposals in the prior art.

The invention responds to the problems in the prior art through the utilization of a container having a centrally-depressed receptacle with an outwardly and downwardly extending rim. In order to produce the food product, a pre-prepared filling is first deposited in the container receptacle. The container receptacle and rim are then covered with a sheet of unbaked dough so that the dough conforms to the container rim. The now-filled and covered container is then frozen for subsequent sale. Degradation of the product during storage will be minimized because the filling is completely enclosed, thereby minimizing dehydration. The dough is maintained in position above the filling, thereby minimizing absorption of moisture from the filling or topping during storage and heating.

When the purchaser is ready to consume the product, he or she merely applies a sufficient amount of heat to the product, thus heating the filling to a fluid state. Therefore, when the product is inverted and the container is removed, the filling flows outwardly to fill the upstanding crust formed by the dough which is now baked.

These and other objects, features and advantages of the present invention will be apparent from the following description, appended claims and annexed drawings.

BRIEF DESCRIPTION OF THE DRAWINGS

FIG. 1 is a plan view of the top of a container which may be utilized in the inventive process described herein;

FIG. 2 is a plan view of the underside of the container depicted in FIG. 1;

FIG. 3 is a partially sectioned elevation view taken along line 3—3 of FIG. 1;

FIG. 4 is a sectional elevation view of a filled and covered upright container of the type depicted in FIG. 1; and FIG. 5 is a sectional elevation view of the food product of this invention after it has been inverted and the container removed, with the container shown in its position prior to removal in dotted lines.

DETAILED DESCRIPTION OF THE PREFERRED EMBODIMENTS

The principles of this invention are particularly useful when a container such as that illustrated in FIGS. 1-5 is utilized. In the Figures the container is generally indicated by the numeral 10. The container 10 is typically three hundredths (0.03) of an inch thick, and is constructed of ovenable material such as fibrous paperboard. However, other conventional materials such as aluminum may alternatively be used. The term "ovenable" as used herein is intended to define a material which can sustain oven temperatures of up to approximately 425 degrees Fahrenheit for up to 45 minutes without adverse effect. When paperboard is used, its upper surface (according to the position of the container in FIGS. 1-4) should be coated with a non-stick substance such as silicon. This coating operation may be performed during fabrication of the container 10 by merely spraying the non-sticking substance on the container 10.

The container 10 includes a centrally-depressed receptacle 12 which is defined by a base 14 at the bottom of the container 10, and sidewalls 16. In the preferred embodiment depicted in the Figures, the sidewalls 16 slope outwardly at an angle of 22.5 degrees from vertical. In certain applications, particularly with respect to pizzas, it may be desirable that this angle be substantially greater, that is, that the container be substantially shallower and flatter than the depicted, preferred, embodiment.

The container 10 also includes an outwardly and downwardly extending rim 18. The rim 18 typically extends at the same angle from the vertical as the sidewalls 16, i.e., 22.5 degrees in the depicted embodiment. In certain instances, it may be desirable that the rim extend outwardly and then downwardly, but this is normally not the preferred arrangement.

The rim 18 preferably terminates in an outwardly extending flange 20. This flange 20 is typically parallel to the base 14, as shown in the Figures.

In the depicted embodiment the base 14 of the container 10 is substantially square with rounded corners. The sidewalls 16, rim 18 and flange 20 extending directly or indirectly from the base 14 therefore similarly define a rounded-corner square, as shown best in the plan views of FIGS. 1 and 2. It should be understood, however, that the container may be any other shape in plan, such as rectangular or even round.

The first step of the present process is to deposit a pre-prepared filling 22 in the container receptacle 12. The term "pre-prepared" merely means that the ingredients have been mixed to the extent necessary. They need not be pre-cooked although in some applications this may be preferable.

The types of fillings which may be used with this invention are widely varied. They include various pot pies, egg dishes, pizza, ethnic dishes and any other type of dish that becomes fluid when a sufficient amount of heat is applied to it.

It may be desirable to add the filling 22 in a series of steps when the filling 22 will include a plurality of layers. For example, when a pizza-like product is produced, it will normally be desirable to add the meat first, then the cheese and other mixed toppings, and finally the sauce. Thus, it can be seen that when such layering is desirable, the layer to be positioned furthest from the dough is added first, with the layer adjacent to the dough being added last.

The filling 22 normally extends no higher than the top of the sidewall 16, and may be considerably below this level, particularly when it is desirable that the filling not be in contact with the sheet of dough 24 which is subsequently laid over the filled container 10.

The addition of this sheet of dough 24 comprises the next step of the process. The dough sheet 24 is sized and shaped such that it extends over the now-filled receptacle 12 and conforms to the outwardly and downwardly extending rim 18. Preferably the dough sheet extends no further than the intersection between the outwardly and downwardly extending portion of the rim 18 and the outwardly extending flange 20, as best shown in FIG. 4. This intersection between the rim 18 and its flange 20 is identified with the numeral 26.

The reason it is desirable that the dough sheet 24 not extend outward with the flange 20 is so that the flange 20 can protect the dough sheet 24 from physical abuse and resulting flaking and/or breakage of the dough sheet 24. It also permits a wrapping (not shown) to be stretched over the container 10 without contacting the edge of the dough sheet 24. Moreover, it prevents the dough from curling around the edge of the rim 18 which would prevent removal of the container 10 after baking.

It may be desirable in certain instances for the dough sheet 24 to stop short of the intersection 26, but in such case the crust formed by the dough sheet 24 would be shallower and therefore would retain less filling 22, as explained more fully hereinbelow. In any event, the coverage by the dough sheet 24 of the container receptacle 12 ensures that the filling 22 will be kept fresh and dehydration will be minimized.

The next step in this first embodiment of the present invention is to freeze the now-filled and covered container 10. In this frozen condition the food product can be stored in an upright condition for extended periods without dehydration of the filling 22 or absorption of moisture from the filling 22 into the dough sheet 24. Moreover, the configuration of the container 10 will minimize the possibility of damage to the dough sheet 24.

When the food product is ready to be consumed it is placed in a conventional oven and heated. A sufficient amount of heat is applied to bake the dough sheet 24 and heat the filling 22 to a fluid state. The term "fluid" as used herein is intended to define a condition in which the filling 22 will flow outward once the food product is inverted and the container 10 is removed. This condition is depicted in FIG. 5, with the original position of the container 10 indicated in dotted lines. Of course, at all times that the container 10 is in place the filling 22 would be retained within the receptacle 12 by the sidewalls 16.

This inventive process thus produces a final food product which consists of an upstanding crust (indicated by the numeral 24') with a filling 22 therein. The upstanding crust 24' will be crisp and/or flaky, rather than soggy, due to the virtual absence of absorbed moisture, and the filling 22 will be fresh and moist due to the lack of dehydration. The upstanding crust 24' may be relatively deep such as that depicted in the Figures. Such shape is ideal for thick pizza, pot pies and the like. As mentioned above, the upstanding crust may be somewhat shallower for thin pizza and similar food products.

A second embodiment of the invention is different from the first only to the extent that it produces a food product which is particularly suited for being heated in a micro-wave oven.

Micro-wave ovens have a great many uses. Unfortunately, they cannot bake bread and other dough-type products with the same quality and desirability with which they cook other food products. Because of this, in order to produce a food product which is particularly suited for being heated in a micro-wave oven, the food product should be heated prior to the freezing step recited above in order to pre-bake the dough sheet 24. Alternatively, the dough sheet may be pre-baked prior to being positioned over the top of the container 10, but this would require that the shape of the pre-baked dough sheet 24' be made to closely correspond to the configuration of the container 10. In any event, when the dough sheet is pre-baked, a micro-wave oven may be used in place of the conventional method mentioned above.

Of course, it should be understood that various changes and modifications of the preferred embodiments described herein will be apparent to those skilled in the art. Such changes and modifications can be made without departing from the spirit and scope of the present invention and without diminishing its attendant advantages. It is therefore intended that such changes and modifications be covered by the following claims:

I claim:

1. A process for producing a frozen, pre-prepared food product, comprising the following steps in the order recited:
   providing an inedible, heatable container having a centrally-depressed receptacle which is defined by a base at the bottom of the container and sidewalls and with an outwardly and downwardly extending rim adjacent said sidewalls and terminating in a free edge;
   depositing a pre-prepared filling which becomes fluid when a sufficient amount of heat is applied to it into said container directly onto said depressed receptacle;
   covering said container receptacle and said container rim with a sheet of unbaked dough and shaping the dough so that said dough conforms to said outwardly and downwardly extending container rim so that upon baking, an inverted edible receptacle is formed including sidewalls and a centrally depressed bottom which will retain the filling when said edible receptacle is positioned such that its depressed bottom is lowermost;
   freezing the now-filled and covered container whereby when the product is heated, said dough bakes while said filling heats to a fluid state so that when the product is inverted and said container is removed, said filling flows outwardly to fill the upstanding crust formed by the now-baked dough.

2. The process of claim 1 wherein during said covering step said dough is terminated short of the free edge of said container rim.

3. The process of claim 1 wherein said filling is deposited into said container receptacle in a plurality of steps with the ingredients to be positioned furthest from said dough being deposited first.

4. The process of claim 3 wherein the food product produced comprises pizza.

5. A process for producing a frozen food product, comprising the following steps in the order recited:
   providing an inedible, heatable container having a centrally-depressed receptacle which is defined by a base at the bottom of the container and sidewalls and with an outwardly and downwardly extending rim adjacent said sidewall and which terminates in an outwardly extending flange;
   depositing a filling which becomes fluid when a sufficient amount of heat is applied to it into said container directly onto said depressed receptacle;
   covering said container receptacle and said container rim with a sheet of unbaked dough and shaping the dough so that said dough conforms to said outwardly and downwardly extending container rim but terminates short of said outwardly extending flange so that upon baking, an inverted edible receptacle is formed including sidewalls and a centrally depressed bottom which will retain the filling when said edible receptacle is positioned such that its depressed bottom is lowermost;
   freezing the now-filled and covered container whereby when a sufficient amount of heat is applied to said container, said filling heats to a fluid state so that when said container is inverted and removed from the food product, said filling flows outwardly to fill the upstanding crust formed by the baked dough which cover said container receptacle and rim.

6. The process of claim 5 further comprising the additional step of heating the filled and covered container prior to said freezing step in order to pre-bake said dough sheet.

* * * * *

UNITED STATES PATENT AND TRADEMARK OFFICE
CERTIFICATE OF CORRECTION

PATENT NO. : 4,265,919

DATED : May 5, 1981

INVENTOR(S) : Ahlgren and Munter

It is certified that error appears in the above—identified patent and that said Letters Patent is hereby corrected as shown below:

Column 1, line 60, please delete "Shrinkwrap" and substitute therefor --Shrink-wrap--;

Column 6, line 30, please delete "cover" and substitute therefor --covered--;

Signed and Sealed this

Eleventh Day of August 1981

[SEAL]

Attest:

GERALD J. MOSSINGHOFF

Attesting Officer

Commissioner of Patents and Trademarks